United States Patent
Wang et al.

(10) Patent No.: US 12,202,919 B2
(45) Date of Patent: Jan. 21, 2025

(54) SUPERIOR C2C3C4 TERPOLYMER BASED CAST FILM AND C2C3C4 TERPOLYMER

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/272,921

(22) PCT Filed: Jul. 29, 2021

(86) PCT No.: PCT/EP2021/071334
§ 371 (c)(1),
(2) Date: Jul. 18, 2023

(87) PCT Pub. No.: WO2022/167107
PCT Pub. Date: Aug. 11, 2022

(65) Prior Publication Data
US 2024/0279408 A1    Aug. 22, 2024

(30) Foreign Application Priority Data
Feb. 2, 2021  (EP) .................... 21154802

(51) Int. Cl.
| | |
|---|---|
| C08L 23/12 | (2006.01) |
| C08F 210/06 | (2006.01) |
| C08F 210/16 | (2006.01) |
| C08J 5/18 | (2006.01) |
| C08L 23/08 | (2006.01) |
| C08F 210/08 | (2006.01) |

(52) U.S. Cl.
CPC .......... *C08F 210/06* (2013.01); *C08F 210/16* (2013.01); *C08J 5/18* (2013.01); *C08L 23/0815* (2013.01); *C08L 23/12* (2013.01); *C08F 210/08* (2013.01); *C08F 2500/12* (2013.01); *C08F 2500/27* (2021.01); *C08F 2500/34* (2021.01); *C08F 2500/36* (2021.01); *C08J 2323/14* (2013.01); *C08J 2323/16* (2013.01); *C08L 2203/16* (2013.01)

(58) Field of Classification Search
CPC .... C08F 210/06; C08F 210/16; C08F 210/08; C08F 2500/36; C08F 2500/12; C08F 2500/27; C08F 2500/34; C08F 2500/26; C08L 23/12; C08L 23/0815; C08L 2203/16
See application file for complete search history.

(56) References Cited

U.S. PATENT DOCUMENTS

| | | | |
|---|---|---|---|
| 6,388,040 B1 | 5/2002 | Fujita | |
| 11,292,858 B2* | 4/2022 | Boragno | ............... C08F 120/02 |
| 11,814,509 B2* | 11/2023 | Gahleitner | ............. C08K 5/098 |
| 2020/0392321 A1* | 12/2020 | Gahleitner | .............. C08L 23/16 |
| 2021/0214527 A1* | 7/2021 | Gahleitner | ........... C08K 5/0083 |
| 2024/0101735 A1* | 3/2024 | Wang | .................... C08F 210/06 |
| 2024/0101771 A1* | 3/2024 | Wang | .................... C08F 210/06 |

FOREIGN PATENT DOCUMENTS

| | | | | |
|---|---|---|---|---|
| EP | 3192817 A1 | 7/2017 | | |
| EP | 3620486 A1 | 3/2020 | | |
| JP | 2000136274 A | 5/2000 | | |
| WO | 9414856 A1 | 7/1994 | | |
| WO | 9512622 A1 | 5/1995 | | |
| WO | 200202576 A1 | 1/2002 | | |
| WO | 2002057342 A2 | 7/2002 | | |
| WO | 2006097497 A1 | 9/2006 | | |
| WO | 2007116034 A1 | 10/2007 | | |
| WO | WO-2008074699 A1 * | 6/2008 | ............. B32B 27/32 | |
| WO | 2009019169 A1 | 2/2009 | | |
| WO | 2011076780 A1 | 6/2011 | | |
| WO | 2012001052 A3 | 3/2012 | | |
| WO | 2012084961 A1 | 6/2012 | | |
| WO | 2011135004 A3 | 10/2012 | | |
| WO | 2013007650 A1 | 1/2013 | | |
| WO | 2013174778 A1 | 11/2013 | | |
| WO | 2015011135 A1 | 1/2015 | | |
| WO | 2015158790 A2 | 10/2015 | | |
| WO | 2018122134 A1 | 7/2018 | | |
| WO | 2019179959 A1 | 9/2019 | | |
| WO | WO-2019197358 A1 * | 10/2019 | ............. C08F 210/02 | |
| WO | WO-2020020808 A1 * | 1/2020 | ............. C08F 210/02 | |
| WO | WO-2020021342 A1 * | 1/2020 | ......... B29D 99/0096 | |
| WO | 2020064190 A1 | 4/2020 | | |

OTHER PUBLICATIONS

International Search Report and Written Opinion for International Paten Application No. PCT/EP2021/071343 mailed Nov. 12, 2021, 12 pages.
Brandolini, et al. "NMR Spectra of Polymers and Polymers Additives", Marcel Dekker, Inc., 2000, 660 pages.
Resconi, et al., "Selectivity in Propene Polymerization with Metallocene Catalysts," Chem. Rev., 2000, vol. 100, pp. 1253-1345.
Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Filip, et al., "Heteronuclear decoupling under fast MAS by a rotor-synchronized Hahn-echo pulse train," Journal of Magnetic Resonance, vol. 176, 2005, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times,". Magnetic Resonance in Chemistry, 2007; 45: S198-S208.

(Continued)

*Primary Examiner* — Rip A Lee
(74) *Attorney, Agent, or Firm* — Lowenstein Sandler LLP

(57) ABSTRACT

Cast film made from terpolymers, and terpolymers containing units derived from propylene, ethylene and 1-butene.

8 Claims, No Drawings

(56) References Cited

OTHER PUBLICATIONS

Castignolles, et al., "Detection and Quantification of Branching in Polyacrylates by Size-Chromatography (SEC) and Melt-State 13c NMR Specroscopy," Polymer 50, 2009, pp. 2373-2383.
Chemical Reviews 2000, 100(4), pp. 1316 to 1327.

* cited by examiner

SUPERIOR C2C3C4 TERPOLYMER BASED CAST FILM AND C2C3C4 TERPOLYMER

CROSS-REFERENCE TO RELATED APPLICATION(S)

The present application is a national stage entry under 35 U.S.C. § 371 of International Application No. PCT/EP2021/071334, filed on Jul. 29, 2021, which claims priority to European Patent Application No. 21154802.9, filed on Feb. 2, 2021. The contents of these applications are hereby incorporated by reference in their entirety.

FIELD OF THE INVENTION

The present invention relates to cast film made from polypropylene terpolymers and to polypropylene terpolymers as such.

BACKGROUND

Optimization of cast films based on copolymers of polypropylene (PP) is a multi-dimensional problem. Many attempts have been made for optimizing the materials suitable for film. WO 2002/057342 A1 describes a biaxially oriented PP (BOPP) film made from Ziegler-Natta catalyst derived copolymers comprising at least 0.8 wt.-% ethylene, particularly 0.8 to 1.5 wt.-%. Although PP terpolymers are prophetically mentioned, such materials are not disclosed in this case. The cast films made from the PP copolymers showed undesirably high haze. WO 2009/019169 A1 describes a process for providing Ziegler-Natta catalyst derived PP terpolymers suitable for blown film comprising at least 8 wt.-% of total comonomer with the comonomer units being derived from ethylene and $C_4$ to $C_8$ alpha olefins by way of using 1,3-diether internal donor catalyst. According to WO 2009/019169 A1, an optimal balance of properties shall be observed when an ethylene content of lower than 2.5 wt.-% is combined with a 1-butene-1 content of higher than 10 wt.-%, whereby alternatively when ethylene content is higher than 2.5 wt.-%, 1-butene content should be lower than 10 wt.-%. A composition having an ethylene content of 1.2 wt.-% and 11.3 wt.-% 1-butene, i.e. a $C_4/C_2$ (wt/wt) ratio of 9.4 resulted in a SIT as low as 107.4° C. and 0.2% haze (1 mm plaque). However, the films had inacceptable high levels of hexane (C6) extractables of 2.8 wt.-% or above. U.S. Pat. No. 6,388,040 concerns BOPP films, i.e. a totally different type of film made from compositions having varying melting temperatures.

EP 3192817 A1 discloses a method for providing a terpolymer including units derived from 1-butene using a crosslinked metallocene compound. EP 3192817 A1 defines ultra-broad ranges as to the structural units derived from 1-butene, namely 4 mol % to 45 mol %, and structural units derived from ethylene 4 mol-% up to 45 mol-% with exemplified amounts of 12.8 mol-% ethylene and 21.1 mol-% 1-butene. Although EP 3192817 A1 has proposed films, films are actually not disclosed in this case.

WO 2013/174778 discloses a propylene based terpolymer of C2, C3 and C4 monomer units made from Ziegler-Natta catalysts. According to WO 2013/174778 the SIT was reported to be below 110° C., like 106° C. However, the XCS is relatively high in the range of 5-15 wt. % at 25° C. and the disclosed films had an inacceptable high level of hexane (C6) extractables (FDA) of 1.8 or above.

Thus, there remains a need for a PP terpolymer based cast film having low sealing initiation temperature such as well below 120° C., low haze such as below 6.0% and particularly low hexane extractables (FDA) such as below 0.75 wt.-%. Simultaneously, the film should have adequate melt flow rate and high dart drop impact.

These aspects are addressed in the present invention, which is based on the finding that a favourable combination of low hexane extractables, low haze, good processability and good sealing properties can be provided when the amounts of ethylene units, 1-butene units, their total amount, the 2.1 regioinversions.

SUMMARY OF THE INVENTION

The present invention insofar provides a cast film made from an ethylene-propylene-1-butene terpolymer including
a) units derived from ethylene in an amount of 0.2 to 2.4 mol-% with respect the total terpolymer; and
b) units derived from propylene in an amount of 91.0 to 95.9 mol-% with respect the total terpolymer; and
c) units derived from 1-butene in an amount of 3.9 to 6.6 mol-% with respect the total terpolymer,
d) whereby the units derived from ethylene, propylene and 1-butene add up to 100 mol-% and
e) a total amount of units derived from ethylene and 1-butene of 4.5 to 8.5 mol.-%, and
f) 2.1 regioinversions in an amount of 0.20 to 0.60 mol-% as determined by $^{13}$C-NMR analysis (as described in the experimental part); and
g) a melt flow rate $MFR_2$ (230° C./2.16 kg) measured according to ISO 1133 in the range from 8 to 14.5 g/10 min, and
h) a melting temperature Tm measured by differential scanning calorimetry (DSC) following the equation $$Tm \geq [150 - 1.6*(\text{defects}) - 0.12*(\text{defects})^2]° \text{ C.,}$$

whereby 'defects' denote the sum of units derived from ethylene, units derived from 1-butene and 2.1 regioinversions, all values in mol-%, and whereby the cast film has a sealing initiation temperature (SIT) (as determined by a method described in the experimental part) below 117° C.

The present invention further provides an ethylene-propylene-1-butene terpolymer including
a) units derived from ethylene in an amount of 0.2 to 2.4 mol-% with respect the total terpolymer; and
b) units derived from propylene in an amount of 91.0 to 95.9 mol-% with respect the total terpolymer; and
c) units derived from 1-butene in an amount of 3.9 to 6.6 mol-% with respect the total terpolymer,
d) whereby the units derived from ethylene, propylene and 1-butene add up to 100 mol-%, and
e) a total amount of units derived from ethylene and 1-butene of 4.5 to 8.5 mol-%, and
f) 2.1 regioinversions in an amount of 0.20 to 0.60 mol-%, as determined by $^{13}$C-NMR analysis (as described in the experimental part); and
g) a melt flow rate $MFR_2$ (230° C./2.16 kg) measured according to ISO 1133 in the range from 8 to 14.5 g/10 min, and
h) a melting temperature Tm measured by differential scanning calorimetry (DSC) following the equation $$Tm \geq \left[150 - 1.6*(\text{defects}) - 0.12*(\text{defects})^2\right]° \text{ C.,}$$

whereby 'defects' denote the sum of units derived from ethylene, units derived from 1-butene and 2.1 regioinversions, all values in mol-%.

Advantageous variants of the cast film and the ethylene-propylene-1-butene terpolymer are specified in the dependent claims.

In yet a further aspect, the present invention concerns a composition including the ethylene-propylene-1-butene terpolymer according to the present invention in an amount of at least 97 wt.-%.

DEFINITIONS

The regio-defects of propylene polymers can be of three different types, namely 2,1-erythro (2, 1e), 2, 1-threo (2, 1t) and 3, 1 defects. A detailed description of the structure and mechanism of formation of regio defects in polypropylene can be found for example in Chemical Reviews 2000, 100(4), pages 1316 to 1327. These defects are measured using $^{13}$C-NMR spectroscopy as described in more detail below.

The term "2, 1 regio defects" or "2, 1 regioinversions" as used in the present invention defines the sum of 2, 1-erythro regio-defects and 2, 1-threo regio defects.

The "terpolymer" according to the present invention denotes a polymer made of the monomers ethylene, propylene and 1-butene, whereby these monomers can be found in the polymer chain. The content of units originating from these monomers adds up to 100 mol-%. Pseudo-terpolymers being made from mixtures of two copolymers do not subsume under the term "terpolymer" according to the present invention. Pseudo-terpolymers can be recognized by coupled TREF-IR, coupled TREF-NMR or similar methods. As a matter of definition, a terpolymer according to the present invention is not a mixture of two copolymers.

The term "defects" denotes the sum of units derived from ethylene, units derived from 1-butene and 2.1 regioinversions, all values in mol-%.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Bimodal as to the units derived from 1-butene means that the terpolymer is obtainable in two reactors coupled in series at a split ratio of 40:60 to 60:40, whereby these reactors are operated such that the intermediate terpolymer being produced in the first reactor differs from the final terpolymer as to the content of units derived from 1-butene by at least 20%, with all contents considered in percent by weight and the first reactor value being used as the reference. For example, 5.0 wt.-% (first reactor) and 6.1 wt.-% (final) fulfills the requirement.

Bimodal as to the molecular weight means that the terpolymer is obtainable in two reactors coupled in series at a split ratio of 40:60 to 60:40.

Terpolymer and Composition

The amount of regioinversions is to some extent dependent on the amount of comonomer, i.e. the higher the comonomer content, the lower the content of 2.1 regioinversions. In addition to that, the 2.1 regioinversions can be influenced by the choice of the polymerization temperature: a higher polymerization temperature favours a lower content of 2.1 regioinversions.

In another preferred aspect, the terpolymer is bimodal as to the units derived from 1-butene. As outlined above under definitions this means two polymers are present, whereby said polymers differ as to their 1-butene content. It is self-explaining that bimodality as to the 1-butene content may be effected by use of two or more reactors in series or by other measures such as parallel reactor setups and subsequent mixing for example in solution.

In another preferred aspect, the terpolymer is bimodal as to the molecular weight. As outlined in the definition section, this again means presence of two polymers, whereby said polymers differ as to their melt flow rate. The same measures as described above and use of a chain transfer agent, conventionally hydrogen will be suitable for the purpose.

The composition according to the present invention includes the terpolymer in an amount of 97 wt.-%. Preferably, the composition according to the present invention consists of the terpolymer as described herein and additives. The additives are preferably selected from the group consisting of slip agents, anti-block agents, UV stabilizers, antistatic agents, acid scavengers, alpha-nucleating agents, antioxidants and mixtures thereof. Such additives are commonly known to a person skilled in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends. Acid scavengers are also commonly known in the art. Examples are calcium stearate (CAS No. 1592-23-0), zinc stearate (CAS No. 557-05-1), sodium stearate, magnesium and zinc oxide, synthetic hydrotalcite (e.g. SHT, CAS No. 11097-59-9), lactates and lactylates.

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate, Kaolin, CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0).

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81).

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Most preferably, these additives are present in the range of 0.01 to 2.0 wt.-% based on the total weight of the polymer composition.

In the most general embodiment, the ethylene-propylene-1-butene terpolymer includes
a) units derived from ethylene in an amount of 0.2 to 2.4 mol-% with respect the total terpolymer; and
b) units derived from propylene in an amount of 91.0 to 95.9 mol-% with respect the total terpolymer; and
c) units derived from 1-butene in an amount of 3.9 to 6.6 mol-% with respect the total terpolymer,
d) whereby the units derived from ethylene, propylene and 1-butene add up to 100 mol-%, and
e) a total amount of units derived from ethylene and 1-butene of 4.5 to 8.5 mol-%, and
f) 2.1 regioinversions in an amount of 0.20 to 0.60 mol-%, as determined by $^{13}$C-NMR analysis (as described in the experimental part); and
g) a melt flow rate MFR$_2$ (230° C./2.16 kg) measured according to ISO 1133 in the range from 8 to 14.5 g/10 min, and
h) a melting temperature Tm measured by differential scanning calorimetry (DSC) following the equation $$Tm \geq [150 - 1.6 * (\text{defects}) - 0.12 * (\text{defects})^2]° \text{ C.},$$

whereby 'defects' denote the sum of units derived from ethylene, units derived from 1-butene and 2.1 regioinversions, all values in mol-%.

In a preferred embodiment the ethylene-propylene-1-butene terpolymer has
a) units derived from ethylene in an amount of 0.2 to 1.2 mol-% with respect the total terpolymer; and
b) units derived from propylene in an amount of 93.6 to 95.3 mol-% with respect the total terpolymer; and
c) units derived from 1-butene in an amount of 4.5 to 5.2 mol-% with respect the total terpolymer,
d) whereby the units derived from ethylene, propylene and 1-butene add up to 100 mol-% and
e) a total amount of units derived from ethylene and 1-butene of 4.8 to 6.5 mol-%, and
f) 2.1 regioinversions in an amount of 0.36 to 0.55 mol-% as determined by $^{13}$C-NMR analysis (as described in the experimental part); and
g) a melt flow rate MFR$_2$ (230° C./2.16 kg) measured according to ISO 1133 in the range from 10 to 14.5 g/10 min, and
h) a melting temperature Tm measured by differential scanning calorimetry (DSC) following the equation $$Tm \geq [150 - 1.6 * (\text{defects}) - 0.12 * (\text{defects})^2]° \text{ C.},$$

whereby 'defects' denote the sum of units derived from ethylene, units derived from 1-butene and 2.1 regioinversions, all values in mol-%

Catalysts

A number of catalysts can be suitable for the present invention.

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO 94/14856 (Mobil), WO 95/12622 (Borealis) and WO 2006/097497.

The average particle size of the silica support can be typically from 10 to 100 µm. However, it has turned out that special advantages can be obtained if the support has an average particle size from 15 to 80 µm, preferably from 18 to 50 µm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes of use in the invention are of formula (II') or (II)

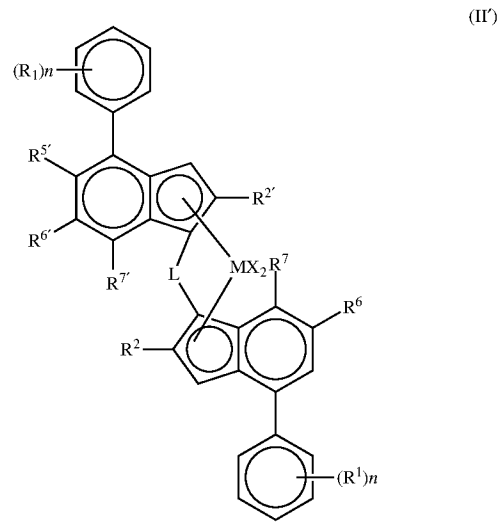

(II)

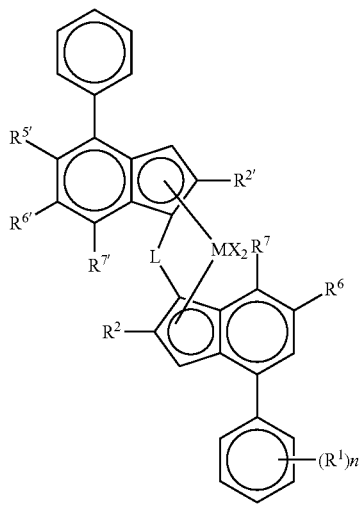

wherein M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C—, —R'$_2$C=CR'$_2$—, —R'$_2$Si—, —R'$_2$Si—SiR'$_2$—, —R'$_2$Ge—, wherein each R' is independently a hydrogen atom, $C_{1-20}$-alkyl, $C_{3-10}$-cycloalkyl, tri($C_{1-20}$-alkyl) silyl, $C_{6-20}$-aryl, $C_{7-20}$ arylalkyl or $C_{7-20}$-alkylaryl;

each of $R^2$ or $R^{2'}$ is a $C_{1-10}$-alkyl group;

$R^{5'}$ is a $C_{1-10}$ alkyl group or $Z'R^{3'}$ group;

$R^6$ is hydrogen or a $C_{1-10}$-alkyl group;

$R^{6'}$ is a $C_{1-10}$-alkyl group or $C_{6-10}$-aryl group; preferably a tertiary alkyl group;

$R^7$ is hydrogen, a $C_{1-6}$-alkyl group or $ZR^3$ group and $R^{7'}$ is hydrogen;

Z and Z' are independently O or S;

$R^{3'}$ is a $C_{1-10}$-alkyl group, or a $C_{6-10}$-aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$-hydrocarbyl group, e.g. $C_{1-10}$-alkyl group.

Further preferred complexes of use in the invention are of formula (III') or (III):

(III)

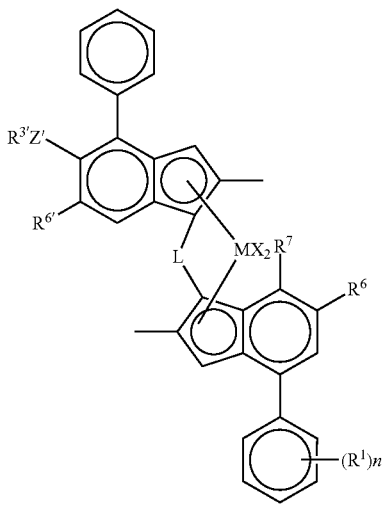

M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C— or —R'$_2$Si— wherein each R' is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $C_{1-6}$-alkyl; Z' is O or S;

$R^{3'}$ is a $C_{1-10}$-alkyl group, or $C_{6-10}$-aryl group optionally substituted by one or more halo groups;

n is independently 0 to 4, e.g. 0, 1 or 2; and each $R^1$ is independently a $C_{1-10}$-alkyl group.

Further preferred complexes of use in the invention are of formula (IV') or (IV):

(III')

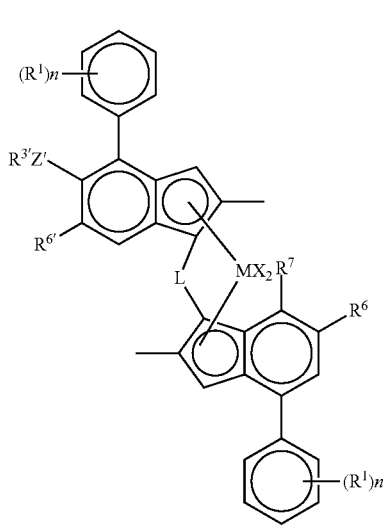

(IV')

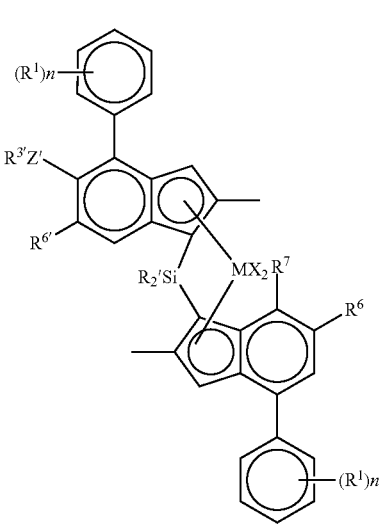

-continued (IV)

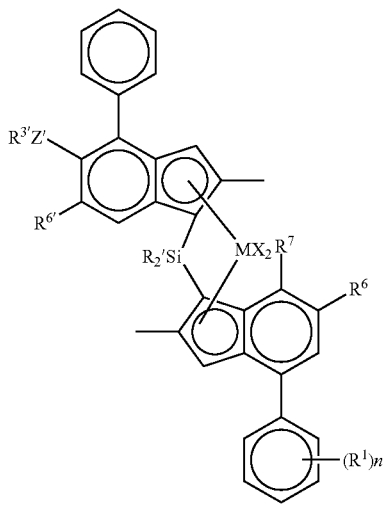

M is zirconium or hafnium;

each X is independently a hydrogen atom, a halogen atom, $C_{1-6}$-alkoxy group, $C_{1-6}$-alkyl, phenyl or benzyl group;

each R' is independently a hydrogen atom, $C_{1-20}$-alkyl or $C_{3-7}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z' is O or S;

$R^{3'}$ is a $C_{1-10}$-alkyl group, or $C_{6-10}$-aryl group optionally substituted by one or more halo groups; n is independently 0, 1 to 2; and each $R^1$ is independently a $C_{3-8}$-alkyl group.

Most preferably, the complex of use in the invention is of formula (V') or (V):

(V')

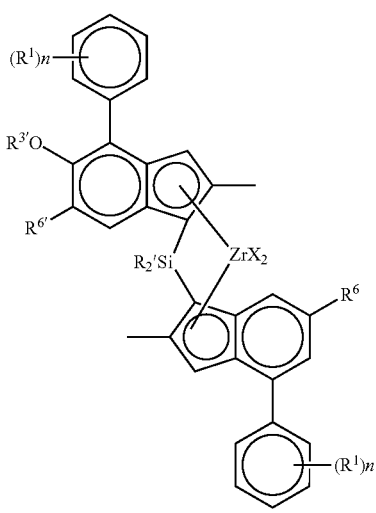

-continued (V)

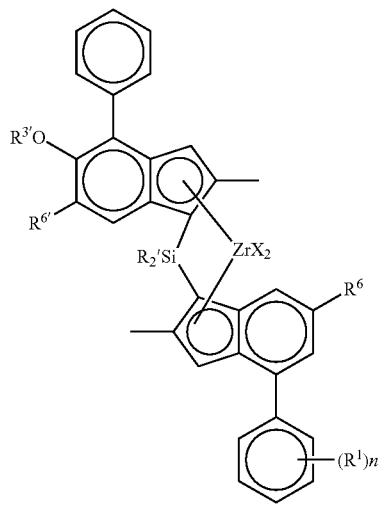

wherein each X is independently a hydrogen atom, a halogen atom, $C_{1-6}$-alkoxy group, $C_{1-6}$-alkyl, phenyl or benzyl group;

R' is independently a $C_{1-6}$-alkyl or $C_{3-10}$-cycloalkyl;

$R^1$ is independently $C_{3-8}$-alkyl;

$R^6$ is hydrogen or a $C_{3-8}$-alkyl group;

$R^{6'}$ is a $C_{3-8}$-alkyl group or $C_{6-10}$-aryl group, preferably a tertiary $C_{4-8}$-alkyl group;

$R^{3'}$ is a $C_{1-6}$-alkyl group, or $C_{6-10}$-aryl group optionally substituted by one or more halo groups; and n is independently 0, 1 or 2.

Particular compounds of the invention include:

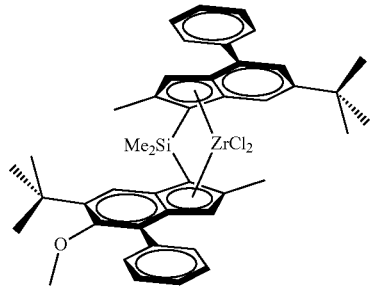

rac-anti-Me$_2$Si(2-Me-4-Ph-6-tBu-Ind)(2-Me-4-Ph-5-OMe-6-tBu-Ind)ZrCl$_2$

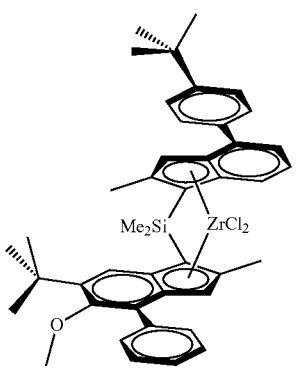

11
rac-anti-Me$_2$Si(2-Me-4-(p-tBuPh)-Ind)(2-Me-4-Ph-5-OMe-6-tBu-Ind)ZrCl$_2$
12
rac-anti-Me$_2$Si(2-Me-4-(p-tBuPh)-Ind)(2-Me-4-Ph-5-OC$_6$F$_5$)-6-iPr-Ind)ZrCl$_2$
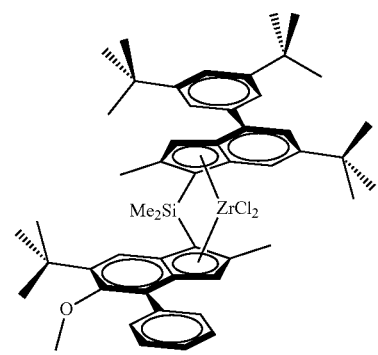
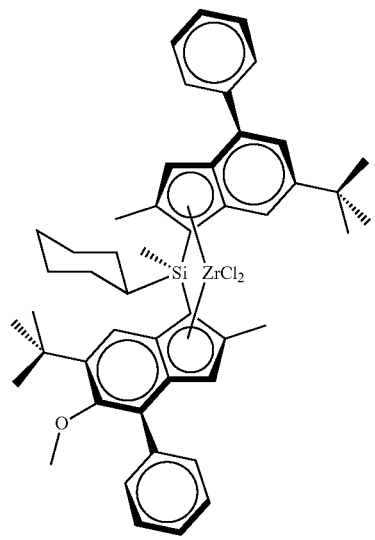
rac-anti-Me$_2$Si(2-Me-4-(3,5-di-tBuPh)-6-tBu-Ind)(2-Me-4-Ph-5-OMe-6-tBu-Ind)ZrCl$_2$
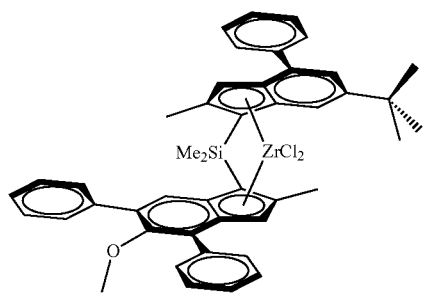
rac-anti-Me(CyHex)Si(2-Me-4-Ph-6-tBu-Ind)(2-Me-4-Ph-5-OMe-6-tBu-Ind)ZrCl$_2$
rac-anti-Me$_2$Si(2-Me-4-Ph-6-tBu-Ind)(2-Me-4,6-di-Ph-5-OMe-Ind)ZrCl$_2$
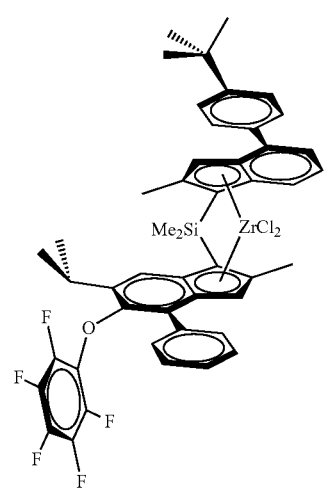
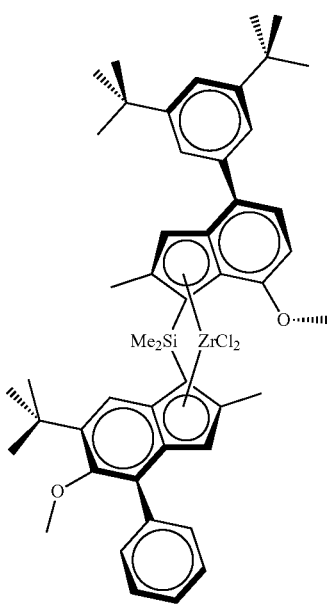

| 13 | 14 |
|---|---|
| rac-anti-Me₂Si(2-Me-4-(3,5-di-tBuPh)-7-OMe-Ind)(2-Me-4-Ph-5-OMe-6-tBu-Ind)ZrCl₂ | rac-anti-Me₂Si(2-Me-4-(p-tBuPh)-Ind)(2-Me-4-(4-tBuPh)-5-OMe-6-tBu-Ind)ZrCl₂ |
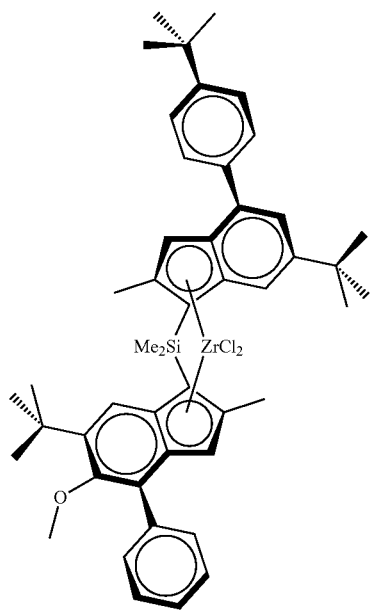
rac-anti-Me₂Si(2-Me-4-(p-tBuPh)-6-tBu-Ind)(2-Me-4-Ph-5-OMe-6-tBu-Ind)ZrCl₂
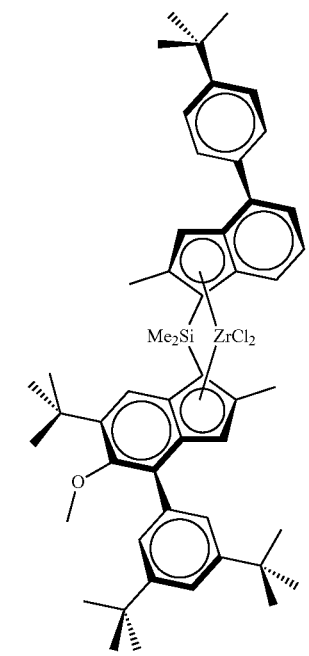
rac-anti-Me₂Si(2-Me-4-(p-tBuPh)-Ind)(2-Me-4-(3,5-tBu2Ph)-5-OMe-6-tBu-IndZrC₂
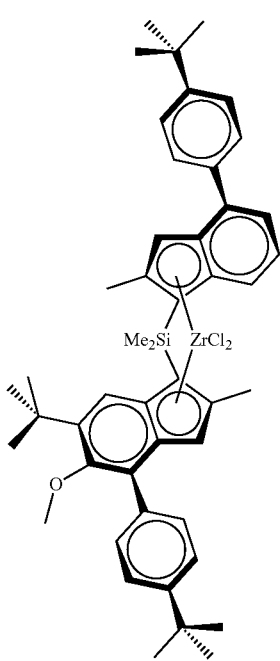
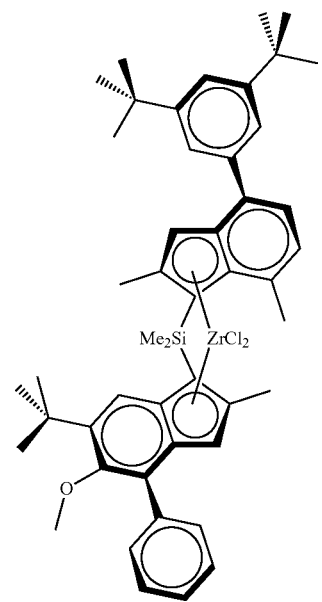

15
rac-anti-Me$_2$Si(2-Me-4-(3,5-di-tBuPh)-7-Me-Ind)(2-Me-4-Ph-5-OMe-6-tBu-Ind)ZrCl$_2$
16
rac-anti-Me$_2$Si(2-Me-4-(p-tBuPh)-6-tBu-Ind)(2-Me-4-Ph-5-OMe-6-tBu-Ind)ZrCl$_2$
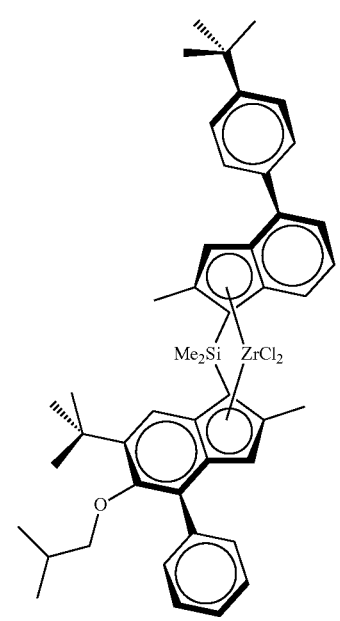
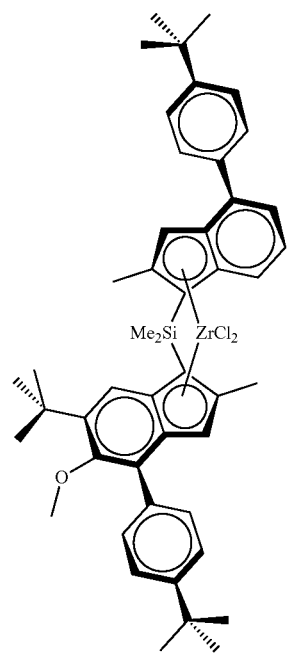
rac-anti-Me$_2$Si(2-Me-4-(p-tBuPh)-Ind)(2-Me-4-Ph-5-OiBu-6-tBu-Ind)ZrCl$_2$
rac-anti-Me$_2$Si(2-Me-4-(p-tBuPh)-Ind)(2-Me-4-(4-tBuPh)-5-OMe-6-tBu-Ind)ZrCl$_2$
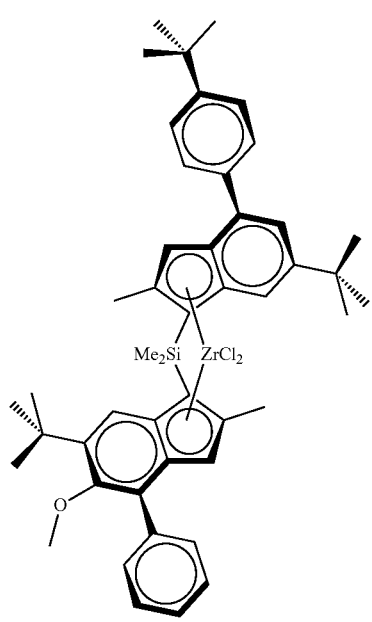
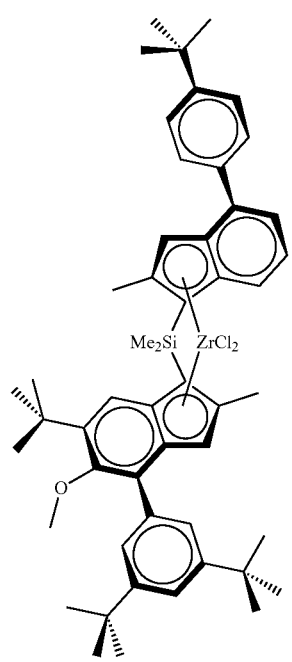

rac-anti-Me$_2$Si(2-Me-4-(p-tBuPh)-Ind)(2-Me-4-(3,5-tBu2Ph)-5-OMe-6-tBu-Ind)ZrCl$_2$

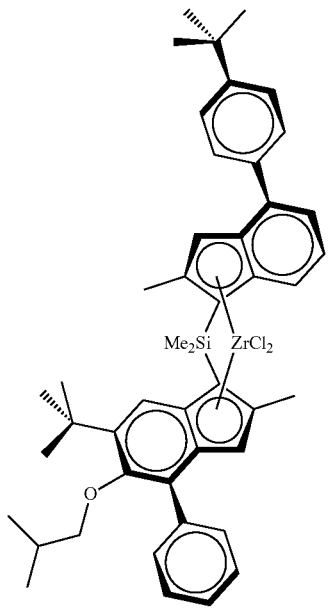

rac-anti-Me$_2$Si(2-Me-4-(p-tBuPh)-Ind)(2-Me-4-Ph-5-OiBu-6-tBu-Ind)ZrCl$_2$

Most preferably rac-anti-Me$_2$Si(2-Me-4-(p-tBuPh)-Ind)(2-Me-4-Ph-5-OMe-6-tBu-Ind)ZrCl$_2$ is used.

The ligands required to form the complexes and hence catalysts of the invention can be synthesized by any process and the skilled organic chemist would be able to devise various synthetic protocols for the manufacture of the necessary ligand materials. For Example WO 2007/116034 discloses the necessary chemistry. Synthetic protocols can also generally be found in WO 2002/02576, WO 2011/135004, WO 2012/084961, WO 2012/001052, WO 2011/076780, WO 2013/007650, WO 2015/158790 and WO 2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (VI):

(VI)

where n is from 6 to 20 and R has the meaning below.

Aluminoxanes are formed on partial hydrolysis of organo-aluminum compounds, for example those of the formula AlR$_3$, AlR$_2$Y and Al$_2$R$_3$Y$_3$ where R can be, for example, C$_1$-C$_{10}$-alkyl, preferably C$_1$-C$_5$-alkyl, or C$_3$-C$_{10}$-cycloalkyl, C$_7$-C$_{12}$-arylalkyl or -alkylaryl and/or phenyl or naphthyl, and where Y can be hydrogen, halogen, preferably chlorine or bromine, or C$_1$-C$_{10}$-alkoxy, preferably methoxy or ethoxy. The resulting oxygen-containing aluminoxanes are not in general pure compounds but mixtures of oligomers of the formula (VI).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (VII)

(VII)

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl. Preferred options are trifluoroborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4,5-trifluorophenyl)borane.

Particular preference is given to tris(pentafluorophenyl) borane.

However, it is preferred that as a boron containing cocatalyst borates are used, i.e. compounds containing a borate.

These compounds generally contain an anion of formula:

(VIII)

where Z is an optionally substituted phenyl derivative, said substituent being a halo-C$_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate.

Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl)borate, N,N-dimethylaniliniumtetrakis(pentafluorophenyl)borate, N,N-di(propyl)ammoniumtetrakis(pentafluorophenyl)borate, di(cyclohexyl)ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate,

N,N-dimethylaniliniumtetrakis(pentafluorophenyl)borate,

N,N-dimethylcyclohexylammoniumtetrakis(pentafluorophenyl)borate or

N,N-dimethylbenzylammoniumtetrakis(pentafluorophenyl)borate

According to the present invention, it is especially preferred to use an aluminoxane cocatalyst, like MAO, together with a boron containing cocatalyst, like borate cocatalyst. Suitable amounts of co-catalyst will be well known to the skilled person.

Preferably, the amount of cocatalyst is chosen to reach molar ratios defined below.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1 The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Other suitable catalysts systems are described in WO2019179959 being incorporated by reference herewith. In the broadest aspect, the catalyst complex fulfills the following structure.

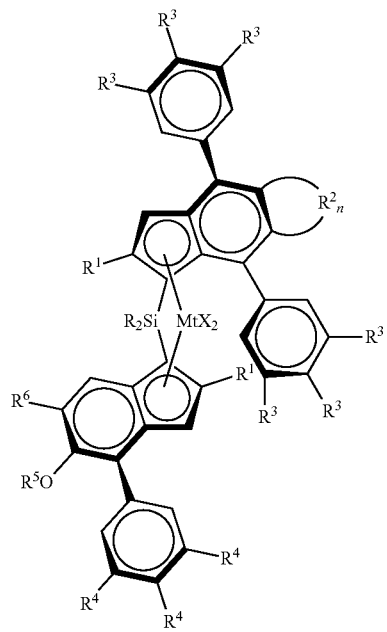

whereby

Mt is Hf or Zr;

each X is a sigma-ligand;

Each $R^1$ independently are the same or can be different and are a $CH_2$—$R^7$ group, with $R^7$ being H or linear or branched $C_{1-6}$-alkyl group, $C_{3-8}$ cycloalkyl group, $C_{6-10}$ aryl group, Each $R^2$ is independently a —CH=, —CY=, —$CH_2$—, —CHY— or —$CY_2$— group, wherein Y is a $C_1$-10 hydrocarbyl group and where n is 2-6, each $R^3$ and $R^4$ are independently the same or can be different and are hydrogen, a linear or branched C1i-C6-alkyl group, an OY group or a C7-20 arylalkyl, C7-20 alkylaryl group or C6-20 aryl group, whereby at least one $R^3$ per phenyl group and at least one $R^4$ is not hydrogen, and optionally two adjacent $R^3$ or $R^4$ groups can be part of a ring including the phenyl carbons to which they are bonded, $R^5$ is a linear or branched Ci-C6-alkyl group, C7-20 arylalkyl, C7-20 alkylaryl group or C6-C20-aryl group, $R^6$ is a $C(R^8)_3$ group, with $R^8$ being a linear or branched C1-6 alkyl group, Each R is independently a C1-C20-hydrocarbyl, C6-C20-aryl, C7-C20-arylalkyl or C7-C20-alkylaryl.

As specific metallocene catalyst complexes the following three embodiments abbreviated MC1, MC2 and MC3 may be mentioned.

MC-1
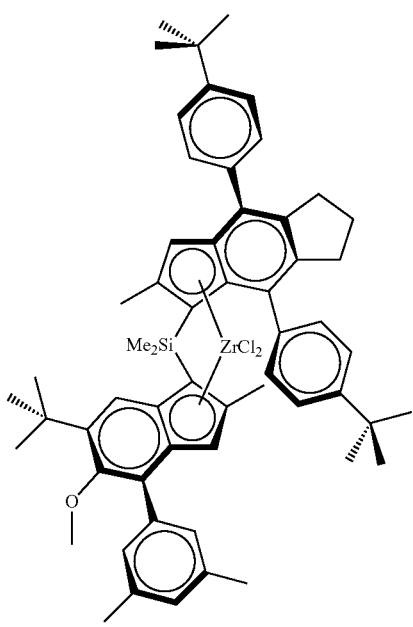

MC-3
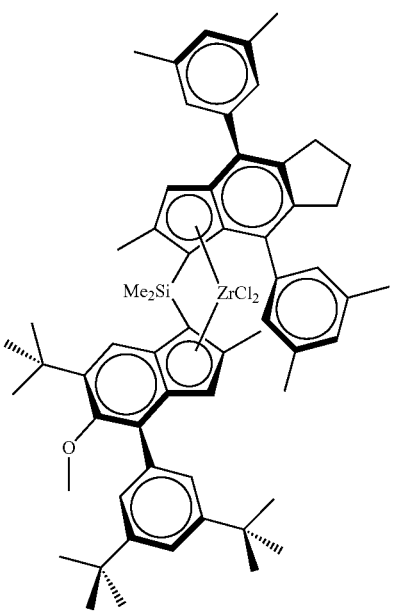

MC-2
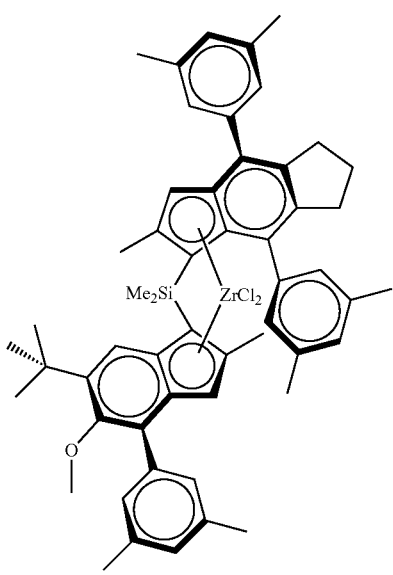

rac-anti-dimethylsilanediyl[2-methyl-4,8-bis-(4<'>-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride (MC-1)

rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride (MC-2)

rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride (MC-3)

including also their corresponding zirconium dimethyl analogues.

The polymer composition according to the present invention may be compounded and pelletized using any of the variety of compounding and blending machines and methods well known and commonly used in the resin compounding art. For blending the individual components of the instant composition a conventional compounding or blending apparatus, for example a Banbury mixer, a 2-roll rubber mill, Buss-co-kneader or a twin-screw extruder may be used. The compositions recovered from the extruder/mixer are usually in the form of pellets. These pellets are then further processed and formed into a cast film according to present invention. The compositions according to the present invention preferably include the terpolymer as described herein in an amount of at least 97 wt.-%. More preferably, the compositions according to the present invention consist of the terpolymer as described herein in an amount of at least 97 wt.-% and additives. Preferred additives for this purpose have been described further above.

Cast Film

The cast film according to the present invention is a made from the ethylene-propylene-1-butene terpolymer as described above. All preferred aspects also hold for the cast film.

As briefly outline above, the present invention concerns a cast film made from an ethylene-propylene-1-butene terpolymer including a) units derived from ethylene in an amount of 0.2 to 2.4 mol-% with respect the total terpolymer; and
b) units derived from propylene in an amount of 91.0 to 95.9 mol-% with respect the total terpolymer; and
c) units derived from 1-butene in an amount of 3.9 to 6.6 mol-% with respect the total terpolymer,
d) whereby the units derived from ethylene, propylene and 1-butene add up to 100 mol-% and
e) a total amount of units derived from ethylene and 1-butene of 4.5 to 8.5 mol-%, and
f) 2.1 regioinversions in an amount of 0.20 to 0.60 mol-% as determined by $^{13}$C-NMR analysis (as described in the experimental part); and
g) a melt flow rate $MFR_2$ (230° C./2.16 kg) measured according to ISO 1133 in the range from 8 to 14.5 g/10 min, and
h) a melting temperature Tm measured by differential scanning calorimetry (DSC) following the equation $$Tm \geq \left[150 - 1.6 * (\text{defects}) - 0.12 * (\text{defects})^2\right] °\ C.,$$

whereby 'defects' denote the sum of units derived from ethylene, units derived from 1-butene and 2.1 regioinversions, all values in mol-%, and
whereby the cast film has a sealing initiation temperature (SIT) (as determined by a method described in the experimental part) below 117° C.

The films in accordance with the present invention can be obtained by converting the polymer compositions in accordance with the present invention into film with conventional film technology, for example cast film technology.

Preferably, the molten polymer is extruded though a slit extrusion die onto a chill roll to cool the polymer to a solid film. Typically, the polymer is firstly compressed and liquefied in an extruder, preferably a single-screw extruder, it being possible for any additives to be already added to the polymer or introduced at this stage via a masterbatch. The melt is then forced through a flat-film die (slit die), and the extruded film is taken off on one or more take-off rolls, during which it cools and solidifies. It has proven particularly favorable to keep the take-off roll or rolls, by means of which the extruded film is cooled and solidified, at a temperature from 10 to 50° C., preferably from 15 to 40° C. Auxiliary devices like an air knife and/or a vacuum box may be used to improve the film quality.

The cast film according to the present invention is preferably made from an ethylene-propylene-1-butene terpolymer having units derived from ethylene in an amount of 0.2 to 1.2 mol-% with respect the total terpolymer.

In another preferred aspect, the cast film according to the present invention is preferably made from an ethylene-propylene-1-butene terpolymer having units derived from 1-butene in an amount of 4.5 to 5.2 mol-% with respect the total terpolymer.

It is also preferred that the cast film according to the present invention is made from an ethylene-propylene-1-butene terpolymer having a total amount of units derived from ethylene and 1-butene of 4.8 to 6.5 mol-%.

It is also preferred that the cast film according to the present invention is made from an ethylene-propylene-1-butene terpolymer having 2.1 regioinversions in an amount of 0.36 to 0.55 mol-% as determined by $^{13}$C-NMR analysis (as described in the experimental part).

In a particularly preferred embodiment, the cast film according to the present invention is made from an the ethylene-propylene-1-butene terpolymer including
a) units derived from ethylene in an amount of 0.2 to 1.2 mol-% with respect the total terpolymer; and
b) units derived from propylene in an amount of 93.6 to 95.3 mol-% with respect the total terpolymer; and
c) units derived from 1-butene in an amount of 4.5 to 5.2 mol-% with respect the total terpolymer,
d) whereby the units derived from ethylene, propylene and 1-butene add up to 100 mol-% and
e) a total amount of units derived from ethylene and 1-butene of 4.8 to 6.5 mol-%, and
f) 2.1 regioinversions in an amount of 0.36 to 0.55 mol-% as determined by $^{13}$C-NMR analysis (as described in the experimental part); and
g) a melt flow rate $MFR_2$ (230° C./2.16 kg) measured according to ISO 1133 in the range from 10 to 14.5 g/10 min, and
h) a melting temperature Tm measured by differential scanning calorimetry (DSC) following the equation $$Tm \geq \left[150 - 1.6 * (\text{defects}) - 0.12 * (\text{defects})^2\right] °\ C.,$$

whereby 'defects' denote the sum of units derived from ethylene, units derived from 1-butene and 2.1 regioinversions, all values in mol-%
whereby the cast film has a sealing initiation temperature (SIT) (as determined by a method described in the experimental part) below 112° C., particularly from 105 to 111° C.

The cast film of the present invention preferably has a tensile modulus determined according to ISO 527-3 at 23° C. on a film with a thickness of 50 µm in machine direction, preferably as well as in transverse direction, in the range of 200 to 800 MPa, preferably in the range of 400 to 700 MPa, more preferably in the range of 520 to 620 MPa In another aspect, the cast film according to the present invention is preferably made from an ethylene-propylene-1-butene terpolymer which is bimodal as to the butene content and/or is bimodal as to the molecular weight It shall be mentioned that film thickness is not limited to 50 micrometer. A 50 micrometer thick film is merely used as a test specimen for easier comparison.

In a preferred embodiment the cast films according the present invention are made from an ethylene-propylene-1-butene terpolymer having a hexane solubility (FDA) of 0.80 wt.-% or less, preferably of 0.70 wt.-% or less, more preferably of 0.65 or less, like in a range of 0.65 to 0.01 wt. %.

Furthermore, a preferred cast film of the present invention has a xylene cold soluble (XCS) fraction determined in line with ISO 16152 in the range of 0.5 to 22.0 wt.-%. In a further preferred embodiment, the cast film of the present invention has a xylene cold soluble (XCS) fraction determined in line with ISO 16152 in the range of 0.5 to 5.0 wt.-%, more preferably in the range of 0.6 to 2.5 wt.-% and even more preferably in the range of 1.0 to 2.0 wt.-%.

The cast film of the present invention preferably has a haze determined according to ASTM D1003-00 on a film with a thickness of 50 m of below 3.0%, preferably in the range of 0.1 to 0.9% and more preferably in the range of 0.2 to 0.5%.

EXPERIMENTAL PART

A. Measuring Methods

The following definitions of terms and determination methods apply for the above general description of the invention as well as to the below examples unless otherwise defined.

a) $MFR_2$ (230° C.) was Measured According to ISO 1133 (230° C., 2.16 kg Load).

b) Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics.

Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-butene were observed {brandolini01} and the comonomer content quantified.

The amount of isolated 1-butene incorporated in PBP sequences was quantified using the integral of the $\alpha B2$ sites at 43.6 ppm accounting for the number of reporting sites per comonomer:

$$B = I_{\alpha B2}/2$$

The amount of consecutively incorporated 1-butene in PBBP sequences was quantified using the integral of the $\alpha\alpha B2B2$ site at 40.5 ppm accounting for the number of reporting sites per comonomer:

$$BB = 2 * I_{\alpha\alpha B2B2}$$

In presence of BB the value of B must be corrected for the influence of the $\alpha B2$ sites resulting from BB:

$$B = (I_{\alpha B2}/2) - BB/2$$

The total 1-butene content was calculated based on the sum of isolated and consecutively incorporated 1-butene:

$$B_{total} = B + BB$$

Characteristic signals corresponding to the incorporation of ethylene were observed {brandolini01} and the comonomer content quantified.

The amount of isolated ethylene incorporated in PEP sequences was quantified using the integral of the $Sp\beta\beta$ sites at 24.3 ppm accounting for the number of reporting sites per comonomer:

$$E = I_{S\beta\beta}$$

If characteristic signals corresponding to consecutive incorporation of ethylene in PEE sequence was observed the $S\beta\delta$ site at 27.0 ppm was used for quantification:

$$EE = I_{S\beta\delta}$$

Characteristic signals corresponding to regio defects were observed {resconi00}. The presence of isolated 2,1-erythro regio defects was indicated by the presence of the two methyl sites at 17.7 and 17.2 ppm, by the methylene site at 42.4 ppm and confirmed by other characteristic sites. The presence of 2,1 regio defect adjacent an ethylene unit was indicated by the two inequivalent $S\alpha\beta$ signals at 34.8 ppm and 34.4 ppm respectively and the $T\gamma\gamma$ at 33.7 ppm.

The amount of isolated 2,1-erythro regio defects ($P_{21e\ isolated}$) was quantified using the integral of the methylene site at 42.4 ppm ($I_{e9}$):

$$P_{21e\ isolated} = I_{e9}$$

If present the amount of 2,1 regio defect adjacent to ethylene ($P_{E21}$) was quantified using the methine site at 33.7 ppm ($I_{T\gamma\gamma}$):

$$P_{E21} = I_{T\gamma\gamma}$$

The total ethylene content was then calculated based on the sum of ethylene from isolated, consecutively incorporated and adjacent to 2,1 regio defects:

$$E_{total} = E + EE + P_{E21}$$

The amount of propene was quantified based on the $S\alpha\alpha$ methylene sites at 46.7 ppm including all additional propene units not covered by $S\alpha\alpha$ e.g. the factor $3*P_{21e\ isolated}$ accounts for the three missing propene units from isolated 2,1-erythro regio defects:

$$P_{total} = 1_{S\alpha\alpha} + 3 * P_{21e\ isolated} + B + 0.5 * BB + E + 0.5 * EE + 2 * P_{E21}$$

The total mole fraction of 1-butene and ethylene in the polymer was then calculated as:

$$fB = B_{total}/(E_{total} + P_{total} + B_{total})$$

$$fE = E_{total}/(E_{total} + P_{total} + B_{total})$$

The mole percent comonomer incorporation was calculated from the mole fractions:

$$B \,[\text{mol \%}] = 100 * fB$$

$$E \,[\text{mol \%}] = 100 * fE$$

The weight percent comonomer incorporation was calculated from the mole fractions:

$$B\,[\text{wt.-\%}] =$$
$$100*(fB*56.11)/((fE*28.05) + (fB*56.11) + ((1-(fE+fB))*42.08))$$

$$E\,[\text{wt.-\%}] =$$
$$100*(fE*28.05)/((fE*28.05) + (fB*56.11) + ((1-(fE+fB))*42.08))$$

The mole percent of isolated 2, 1-erythro regio defects was quantified with respect to all propene:

$$[21e] \,\text{mol \%} = 100 * P_{21e\,isolated}/P_{total}$$

The mole percent of 2, 1 regio defects adjacent to ethylene was quantified with respect to all propene:

$$[E21] \,\text{mol \%} = 100 * P_{E21}/P_{total}$$

The total amount of 2, 1 defects was quantified as following:

$$[21] \,\text{mol \%} = [21e] + [E21]$$

Characteristic signals corresponding to other types of regio defects (2, 1-threo, 3, 1 insertion) were not observed {resconi00}.

Literature (as Referred to Above)

c) DSC Analysis, Melting Temperature (Tm) and Crystallization Temperature (Tc):

was measured with a TA Instrument Q2000 differential scanning calorimetry (DSC) on 5 to 7 mg samples. DSC was run according to ISO 11357/part 3/method $C_2$ in a heat/cool/heat cycle with a scan rate of 10° C./min in the temperature range of −30° C. to +225° C. Crystallization temperature (Tc) and crystallization enthalpy (Hc) were determined from the cooling step, while melting temperature (Tm) and melting enthalpy (Hm) were determined from the second heating step.

d) Cast Films

The cast film properties (except hexane solubles and tensile modulus) were determined on a cast film produced from a single screw extruder with a barrel diameter of 30 mm and a slit die of 200×0.5 mm in combination with a chill- and take-up roll. The melt temperature was 260° C. in the die. The chill roll and the take-up roll were kept at 15° C. and the film thickness was 50 μm.

e) Haze was determined according to ASTM D1003-00 on the cast test films of 50 micrometer thickness.

g) Sealing Initiation Temperature (SIT); Sealing End Temperature (SET),

Sealing initiation temperature (SIT); sealing end temperature (SET), sealing range: The method determines the sealing temperature range (sealing range) of polypropylene films, in particular blown films or cast films according to ASTM F1921-12. Seal pressure, cool time and peel speed were modified as stated below.

The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range was determined on a J&B Universal Sealing Machine Type 3000 with a cast film of 50 μm thickness with the following further parameters:
Specimen width: 25.4 mm
Seal Pressure: 0.1 N/mm<2>
Seal Time: 0.1 see
Cool time: 99 see
Peel Speed: 10 mm/see
Start temperature: 80° C.
End temperature: 150° C.
Increments: 10° C.

| | |
|---|---|
| klimke06 | Klimke, K., Parkinson, M., Piel, C., Kaminsky, W., Spiess, H. W., Wilhelm, M., Macromol. Chem. Phys. 2006; 207: 382. |
| parkinson07 | Parkinson, M., Klimke, K., Spiess, H. W., Wilhelm, M., Macromol. Chem. Phys. 2007; 208: 2128. |
| pollard04 | Pollard, M., Klimke, K., Graf, R., Spiess, H. W., Wilhelm, M., Sperber, O., Piel, C., Kaminsky, W., Macromolecules 2004; 37: 813. |
| filip05 | Filip, X., Tripon, C., Filip, C., J. Mag. Resn. 2005, 176, 239 |
| griffin07 | Griffin, J. M., Tripon, C., Samoson, A., Filip, C., and Brown, S. P., Mag. Res. in Chem. 2007 45, S1, S198. |
| castignolles09 | Castignolles, P., Graf, R., Parkinson, M., Wilhelm, M., Gaborieau, M., Polymer 50 (2009) 2373. |
| resconi00 | Resconi, L., Cavallo, L., Fait, A., Piemontesi, F., Chem. Rev. 2000, 100, 1253. |
| brandolini01 | A. J. Brandolini, D. D. Hills, "NMR spectra of polymers and polymer additives", Marcel Deker Inc., 2000 |

Specimen is sealed A to A at each sealbar temperature and seal strength (force) was determined at each step.

The temperature was determined at which the seal strength reaches 5 N.

h) Hexane (C6) Extractables

The hexane extractable fraction was determined according to the FDA method (federal registration, title 21, Chapter 1, part 177, section 1520, s. Annex B).

The measurements were carried out according to FDA section 177.1520 with 1 g of a polymer film of 100 µm thickness being added to 400 ml hexane at 50° C. for 2 hours while stirring with a reflux cooler. After 2 hours, the mixture is immediately filtered on a filter paper. The precipitate is collected in an aluminium recipient and the residual hexane is evaporated on a steam bath under $N_2$ flow. The amount of hexane solubles is determined by the formula ((wt. sample+ wt. crucible)–(wt crucible))/(wt. sample)×100%.

The film used in the test had been produced on a Collin cast film lab line, with melt temperature of 230° C., output rate of 8 kg/h, chill roll temperature 40° C.

i) Tensile Modulus

Tensile Modulus in machine and transverse direction are determined according to ISO 527-3 at 23° C. on a cast film test specimen of 50 µm thickness produced on a monolayer cast film line with a melt temperature of 220° C. and a chill roll temperature of 20° C. with a thickness of 50 µm produced as indicated above. Testing was performed at a cross head speed of 1 mm/min.

m) Xylene Cold Solubles (XCS)

The xylene soluble (XS) fraction as defined and described in the present invention was determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/–0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\ \% = (100 * m * V_0)/(m_0 * v);$$

$m_0$ = initial polymer amount (g);

$m$ = weight of residue (g);

$V_0$ = initial volume (ml);

$v$ = volume of analysed sample (ml).

B. Examples

Preparation of the Catalyst System for Examples IE1-IE3

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst used in the examples IE1 to IE3 was prepared from MC1 as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol.

Preparation of the Catalyst System for Examples CE1-CE2

For Comparative Examples CE1 and CE2 a Ziegler Natta catalyst commercially available from Lyondell Basell under the tradename Avant ZN180 was used. As cocatalyst TEAL, with feeding rate of 150 g/t $C_3$, was used and dicyclopentyldimethoxysilane (=donor D, CAS No. 126990-35-0) was used as external donor with a feeding rate of 40 g/t $C_3$.

Polymerization and Pelletization

Terpolymers IE1-IE3 were produced in a Borstar pilot plant comprising a prepolymerization reactor, one loop reactor and a gas phase reactor coupled in series. The polymerization conditions as well as the results of polymer characterization are indicated in Table 1. IE1-IE3 were made with metallocene catalyst system as described above and CE1-CE2 were made with ZN catalyst as described above.

TABLE 1

| Polymerization process conditions for IEs and CEs. | | | | | | |
|---|---|---|---|---|---|---|
| | | IE1 | IE2 | IE3 | CE1 | CE2 |
| Prepolymerization reactor | | | | | | |
| Temperature | [° C.] | 20 | 20 | 20 | 20 | 20 |
| Pressure | [kPa] | 4911 | 4911 | 4911 | 5160 | 5200 |
| C3 feed | [kg/h] | 60.7 | 60.8 | 60.9 | 63.0 | 63.0 |
| H2 | [g/h] | 0.7 | 1.7 | 1.7 | 1.0 | 1.0 |
| Loop reactor | | | | | | |
| Temperature | [° C.] | 75 | 75 | 70 | 63 | 63 |
| Pressure | [kPa] | 4828 | 4828 | 5138 | 5170 | 5200 |
| Feed H2/C3 ratio | [mol/kmol] | 0.1 | 0.1 | 0.1 | 0.6 | 0.6 |
| Feed C2/C3 ratio | [mol/kmol] | 1.2 | 10.6 | 17.8 | 5.5 | 10.9 |
| Feed C4/C3 ratio | [mol/kmol] | 30.0 | 29.8 | 30.3 | 200 | 201 |
| Polymer residence time | [h] | 0.4 | 0.4 | 0.4 | 0.4 | 0.4 |
| Polymer Split | [wt.-%] | 54 | 43 | 47 | 100 | 100 |
| MFR$_2$ | [g/10 min] | 2.0 | 2.0 | 2.0 | 1.5 | 2.3 |
| Total C2 | [wt.-%] | n.d. | 0.6 | 1.2 | 0.52 | 1.1 |
| Total C4 | [wt.-%] | 5.5 | 5.5 | 5.5 | 6.2 | 6.7 |
| XCS | [%] | n.m. | n.m. | n.m. | 4.1 | 12.8 |

TABLE 1-continued

Polymerization process conditions for IEs and CEs.

|  |  | IE1 | IE2 | IE3 | CE1 | CE2 |
|---|---|---|---|---|---|---|
| Gas phase reactor | | | | | | |
| Temperature | [° C.] | 75 | 75 | 75 | 75 | 75 |
| Pressure | [kPa] | 2480 | 2480 | 2480 | 1700 | 1700 |
| H2/C3 ratio | [mol/kmol] | 1.1 | 1.2 | 1.5 | 1.3 | 1.7 |
| C2/C3 ratio | [mol/kmol] | 33.6 | 70.3 | 120.7 | 1.7 | 3.7 |
| C4/C3 ratio | [mol/kmol] | 52 | 51 | 59 | 191 | 197 |
| Polymer residence time | [h] | 2.0 | 2.0 | 2.0 | 1.0 | 1.0 |
| Polymer split | [wt.-%] | 46 | 57 | 53 | 0 | 0 |
| MFR$_2$ | [g/10 min] | 2.0 | 2.0 | 2.0 | 1.2 | 2.0 |
| Final Composition | | | | | | |
| MFR2 | [g/10 min] | 2.1 | 2.6 | 2.2 | 3.4 | 2 |
| C2 | [mol-%] | 0.3 | 1.2 | 2.2 | 0.6 | 2.0 |
| C4 | [mol-%] | 4.6 | 5.1 | 6.0 | 4.7 | 5.7 |
| 2.1 | [mol-%] | 0.51 | 0.37 | 0.32 | 0 | 0 |
| C2 + C4 | [mol-%] | 4.9 | 6.3 | 8.2 | 5.3 | 7.7 |
| C4/C2 | [mol/mol] | 15.3 | 4.3 | 2.7 | 7.8 | 2.9 |
| Tm | [° C.] | 139 | 134 | 130 | 146 | 139 |
| Inequation cl. 1 right side | | 137.8 | 134.0 | 127.7 | 138.1 | 130.6 |
| Inequation met? | | yes | yes | yes | yes | yes |
| XCS | wt. % | 1.04 | 1.94 | 20 | 4.72 | 7.85 |
| Tc | ° C. | 103 | 98 | 94 | 106 | 99 |
| H$_{m1}$ | J/g | 83 | 77 | 71 | 83 | 76 |
| C6 (FDA) | wt. % | 0.63 | 0.61 | 0.75 | 2.38 | 3.08 | n.m. = not measured.

It can be seen that carefully tailring the amount of units derived from ethylene, the total amount of units derived from ethylene and butene, as well as the control of 2.1 regioinversions results in relatively low melting temperature for a given amount of total defects. Simultaneously the hexane solubility is also very low.

The obtained polymers were compounded in a co-rotating twin-screw extruder Coperion ZSK 57 at 220° C. with 1500 ppm antioxidant (Irganox B215, commercially available from BASF) and 500 ppm Ca-stearate. The final MFR$_2$ of the final composition was reached via visbreaking in the twin-screw extruder using an appropriate amount (350 ppm for all examples) of (tert-butylperoxy)-2,5-dimethylhexane (Trigonox 101, distributed by Akzo Nobel, Netherlands). The characteristics of the cast films made from the terpolymers are provided below in Table 2.

TABLE 2

Characteristics of the polymer compositions and cast films

|  |  | IE1 | IE2 | IE3 | CE1 | CE2 |
|---|---|---|---|---|---|---|
| Film type |  | cast | cast | cast | cast | cast |
| TM/MD | MPa | 614 | 536 | 452 | 574 | 430 |
| Haze | % | 0.22 | 0.49 | 0.30 | 0.54 | 0.65 |
| Clarity | % | 99.8 | 99.8 | 99.8 | 99.3 | 99.0 |
| SIT | ° C. | 111 | 106 | 103 | 117 | 112 |

As can be gathered from Table 2 the terpolymer according to the present invention (IE1 to IE3) the films made of these materials show a lower sealing initiation temperature in contrast to the examples CE1 and CE2. In addition, the optical and mechanical properties of the films in accordance with the present invention have very good mechanical and optical properties.

The invention claimed is:

1. An ethylene-propylene-1-butene terpolymer having
   a) units derived from ethylene in an amount of 0.2 to 1.2 mol-% with respect to a total terpolymer; and
   b) units derived from propylene in an amount of 93.6 to 95.3 mol-% with respect to the total terpolymer; and
   c) units derived from 1-butene in an amount of 4.5 to 5.2 mol-% with respect to the total terpolymer,
   d) wherein the units derived from ethylene, propylene and 1-butene add up to 100 mol-% and
   e) a total amount of units derived from ethylene and 1-butene of 4.8 to 6.5 mol-%, and
   f) 2,1 regioinversions in an amount of 0.36 to 0.55 mol-% as determined by $^{13}$C-NMR analysis; and
   g) a melt flow rate MFR$_2$ (230° C./2.16 kg) measured according to ISO 1133 in a range from 10 to 14.5 g/10 min, and
   h) a melting temperature Tm measured by differential scanning calorimetry (DSC) following the equation $$Tm \geq \left[150 - 1.6 * (\text{defects}) - 0.12 * (\text{defects})^2\right] ° C,$$

wherein 'defects' denote a sum of units derived from ethylene, units derived from 1-butene and 2,1 regio-inversions, all values in mol-%.

2. A composition including the ethylene-propylene-1-butene terpolymer according to claim 1 in an amount of at least 97 wt-% with respect to a total composition.

3. The composition according to 2, consisting of the ethylene-propylene-1-butene terpolymer according to claim 1 in an amount of 97 wt-% with respect to the total composition and additives.

4. Cast film made from an ethylene-propylene-1-butene terpolymer, wherein the ethylene-propylene-1-butene terpolymer includes a) units derived from ethylene in an amount of 0.2 to 1.2 mol-% with respect to a total terpolymer; and
b) units derived from propylene in an amount of 93.6 to 95.3 mol-% with respect to the total terpolymer; and
c) units derived from 1-butene in an amount of 4.5 to 5.2 mol-% with respect to the total terpolymer,
d) wherein the units derived from ethylene, propylene and 1-butene add up to 100 mol-% and
e) a total amount of units derived from ethylene and 1-butene of 4.8 to 6.5 mol-%, and
f) 2,1 regioinversions in an amount of 0.36 to 0.55 mol-% as determined by $^{13}$C-NMR analysis; and
g) a melt flow rate $MFR_2$ (230° C./2.16 kg) measured according to ISO 1133 in a range from 10 to 14.5 g/10 min, and
h) a melting temperature Tm measured by differential scanning calorimetry (DSC) following the equation $$Tm \geq [150 - 1.6 * (\text{defects}) - 0.12 * (\text{defects})^2]° \, C,$$

wherein defects denote a sum of units derived from ethylene, units derived from 1-butene and 2,1 regioinversions, all values in mol-%,
wherein the film has a sealing initiation temperature (SIT) (as determined by a method described in the experimental part) below 112° C.

5. The cast film according to claim 4, wherein a test specimen cast film having a thickness of 50 μm has a tensile modulus determined according to ISO 527-3 at 23° C. in machine direction (MD) of 200 to 800 MPa.

6. The cast film according to claim 4, wherein the xylene cold soluble (XCS) fraction determined according to ISO 16152 is in the range of 0.5 to 5.0 wt-%.

7. The cast film according to claim 4, wherein the film has a sealing initiation temperature (SIT) (as determined by the method described in the experimental part) from 105 to 111° C.

8. The cast film according to claim 4, wherein a test specimen cast film having a thickness of 50 μm has a tensile modulus determined according to ISO 527-3 at 23° C. in machine direction (MD) of 520 to 620 MPa.

* * * * *